United States Patent [19]
Kroninger et al.

[11] Patent Number: 5,648,984
[45] Date of Patent: Jul. 15, 1997

[54] MULTIDIRECTIONAL REPEATER FOR DATA TRANSMISSION BETWEEN ELECTRICALLY ISOLATED AND/OR PHYSICALLY DIFFERENT SIGNAL TRANSMISSION MEDIA

[75] Inventors: Robert S. Kroninger, Phoenix, Ariz.; Clifton C. Powers, Raleigh, N.C.

[73] Assignee: Alcatel Networks Systems, Inc., Richardson, Tex.

[21] Appl. No.: 288,392

[22] Filed: Aug. 10, 1994

[51] Int. Cl.$^6$ .................................................. H04B 3/36
[52] U.S. Cl. .............................................. 375/211; 178/73
[58] Field of Search ................................ 375/211, 212, 375/214, 213, 215; 370/13.1, 35, 97, 246, 270, 274, 285, 293, 492, 507; 371/20.2; 178/73, 761

[56] References Cited

U.S. PATENT DOCUMENTS

| | | | |
|---|---|---|---|
| 4,070,545 | 1/1978 | Diefenderfer | 178/73 |
| 4,451,916 | 5/1984 | Casper et al. | 395/182 |
| 4,839,886 | 6/1989 | Wu et al. | 370/815 |
| 4,943,979 | 7/1990 | Webber, Jr. | 375/214 |
| 5,020,132 | 5/1991 | Nazarenk et al. | 375/214 |
| 5,121,410 | 6/1992 | Demarais | 375/211 |
| 5,161,192 | 11/1992 | Carter et al. | 380/48 |
| 5,251,203 | 10/1993 | Thompson | 370/13.1 |
| 5,265,124 | 11/1993 | Staak et al. | 375/211 |
| 5,303,261 | 4/1994 | Tunod et al. | 375/214 |

FOREIGN PATENT DOCUMENTS 9315300 6/1995 France.

OTHER PUBLICATIONS

A. S. Tanenbaum, Computer Networks, pp. 352–359 (1981).
Encyclopedia of Computer Science, pp. 578–579 (A. Ralston et al. 3rd ed. 1993).

Stallings, Data and Computer Communications, 1994, p. 411 and Acronyms Section.

Baker, SMU Course #EE 6376 CSE 6376 NJU Course# ST 750–N Data Communications Session #32 Copywrite 1994 pp. 127–128.

Primary Examiner—Wellington Chin
Assistant Examiner—William Luthor
Attorney, Agent, or Firm—Ware, Fressola, Van Der Sluys & Adolphson LLP

[57] ABSTRACT

In a signal transmission network, such as a data network, having a multiple access bus topology (12) in which many nodes reside and communicate over the same bus, and wherein electrically isolated and/or physically different signal transmission media (17,18,19) are encompassed by the bus (12), and wherein a common protocol is used across the entire network; a multidirectional repeater (10) repeats signals from any one of the signal transmission media to one or more of the other signal transmission media, thereby providing a contiguous logical bus across the different signal transmission media. The multidirectional repeater (10) uses logic transitions, e.g., the presence or absence of data, a change in a data or logic state, the presence or absence of a carrier, a change in a carrier frequency, or any other suitable indication that data is present on one of the signal transmission media (17,18,19) for determining when to repeat signals from that signal transmission media to other signal transmission media and for determining when to stop repeating signals. An interface (21,22,23) is provided between each signal transmission media (17,18,19) and the multidirectional repeater (10) to disable the transmission of data to the bus (12) so that only signals from one signal transmission media are being repeated at a time. The multidirectional repeater (10) determines which data to repeat when data is available on one or more signal transmission media.

17 Claims, 2 Drawing Sheets

MULTIDIRECTIONAL REPEATER FOR DATA TRANSMISSION BETWEEN ELECTRICALLY ISOLATED AND/OR PHYSICALLY DIFFERENT SIGNAL TRANSMISSION MEDIA

TECHNICAL FILED

The present invention relates to the transmission of signals between different physical layers in a signal transmission network, and more particularly to data transmission between electrically isolated and/or physically different signal transmission media by automatically repeating data from one physical layer to one or more different physical layers.

BACKGROUND OF THE INVENTION

In many signal transmission networks, such as computer networks, data must traverse across different physical layers in traveling from one node to another. The different physical layers may represent physically different signal transmission media, e.g., coaxial cable, twisted pair, optical fibers, etc., or simply signal transmission media of the same type that are electrically isolated from one and another. For example, one node of the network may communicate over coaxial cable using frequency shift keying while another node may communicate over twisted pair wire using differential digital transceivers.

Traditionally, communication between nodes on different physical layers has been accomplished using a gateway. The term gateway is typically used to describe a variety of devices, including bridges and routers, which are used to interconnect similar or dissimilar signal transmission media. When connecting various signal transmission media, gateways must perform functions such as message format conversion, addressed translation, and protocol conversion. Gateways typically employ routing tables, e.g., look up tables, distribution algorithms, and other such software algorithms when performing functions such as determining whether the source and destination nodes reside on different sides of the gateway. Additionally, a separate gateway is required at each signal transmission media interface for providing the desired data transmission.

For networks that use the same protocol across the entire network and having frequent communications between the different physical layers, the processing performed by a gateway may degrade overall network performance. The time it takes for information to travel across physical layer boundaries at a gateway increases due to the "store" and "forward" nature of a gateway wherein data is stored and processed prior to being provided across the physical layer.

DISCLOSURE OF THE INVENTION

Objects of the invention include the provision of a multidirectional repeater for data transmission between electrically isolated and/or physically different signal transmission media.

A further object of the present invention is to provide a multidirectional repeater for automatically repeating data from one physical layer of a signal transmission network to one or more different physical layers of the network in a rapid and reliable manner.

A still further object of the present invention is to provide a multidirectional repeater which can interface to any number of physical layers of a signal transmission network, and which can repeat data from any one of the physical layers to the other physical layers.

According to the present invention, in a signal transmission network having a signal transmission bus in which many nodes reside and communicate over the same bus, and wherein electrically isolated and/or physically different signal transmission media are encompassed by the bus; a multidirectional repeater is provided between various electrically isolated and/or physically different signal transmission media having a common protocol and data rate, the multidirectional repeater repeating signals from any one of the various signal transmission media to one or more of the other various signal transmission media, thereby providing a contiguous logical bus across the various signal transmission media.

In further accord with the present invention, the multidirectional repeater uses logic transitions, e.g., the presence or absence of data, a change in a data or logic state, the presence or absence of a carrier, a change in a carrier frequency, or any other suitable indication that data is present on one of the various signal transmission media for determining when to repeat signals from that signal transmission media to other of the various signal transmission media and for determining when to stop repeating signals.

In still further accord with the present invention, an interface is provided between each of the various signal transmission media and the multidirectional repeater to disable the transmission of data to the bus so that only signals from one of the various signal transmission media are being repeated at a time.

According further to the present invention, the multidirectional repeater determines which data to repeat when data is available on one or more of the various signal transmission media. Alternatively, the transmission of data from a signal transmission media to the multidirectional repeater is disabled whenever signals from another of the various signal transmission media are being repeated to thereby resolve conflicts between the various signal transmission media.

According still further to the present invention, the logic transitions provide a preamble of data bits to the multidirectional repeater to allow the multidirectional repeater to establish communications with the various signal transmission media and prevent the loss of data.

The present invention provides a significant improvement over the prior art by providing a multidirectional repeater which automatically repeats data from one physical layer to one or more different physical layers of a signal transmission network without any delay or software intervention. With this technique, physical layers of a network may differ, but the network forms a single, logical bus. Therefore, from a protocol perspective, the physical layers are transparent to the nodes on the network. By providing a single multidirectional repeater for communication between a plurality of physical layers, the requirement for a plurality of gateways with the associated software overhead is eliminated. The multidirectional repeater does not have the requirement to store and process data prior to repeating it on another physical layer, and therefore, the speed of data transmission is increased, and the cost associated with data transmission between various physical layers is reduced.

The foregoing and other objects, features and advantages of the present invention will become more apparent in light of the following detailed description of exemplary embodiment thereof, as illustrated in the accompanying drawings.

BEST MODE FOR CARRYING OUT THE INVENTION

The multidirectional repeater of the present invention is particularly well suited to provide for signal transmission between electrically isolated and/or physically different signal transmission media within a signal transmission network, such as a data network.

Figure 1:
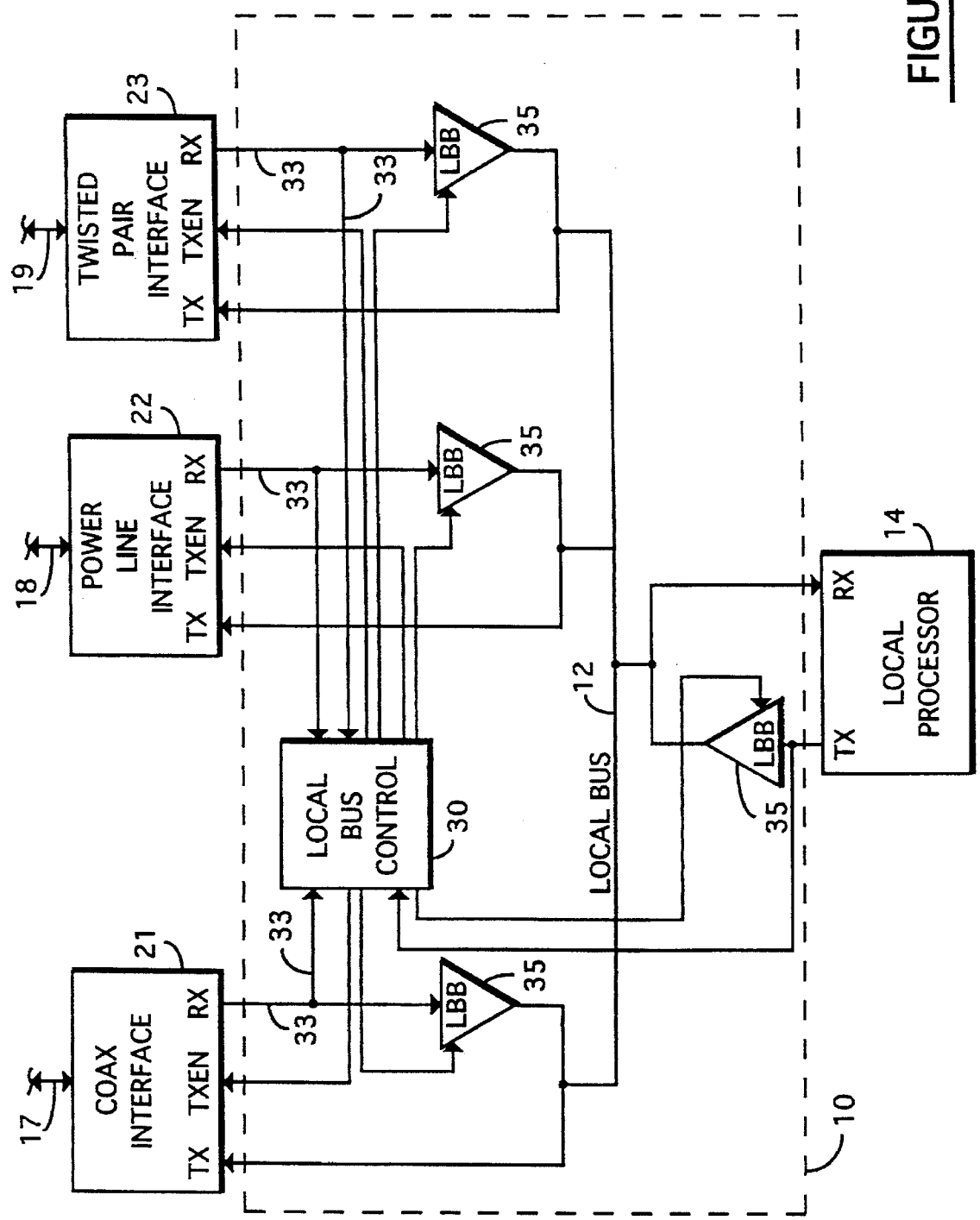
FIG. 1 is a simplified schematic block diagram of a multidirectional repeater connected in a digital communications or data network having physically different signal transmission media in accordance with the present invention.

Referring to FIG. 1, the multidirectional repeater 10 is shown connected on one side to a signal transmission network and on another side to a local processor 14, e.g., a microprocessor or microcomputer. The local processor may, but need not, be part of the multidirectional repeater 10. A multiple access local bus 12, which is part of the repeater 10, is connected by different interfaces to physically different signal transmission media including coaxial cable (coax) 17, power line 18, and twisted pair 19. Each of the different signal transmission media represents a different physical layer, and are connected to the multidirectional repeater and local bus via a physical layer interface 21, 22, 23, respectively. The physical layer interfaces 21, 22, 23 may, but need not, be part of the multidirectional repeater.

There are numerous protocols which exist to handle multiple access to a common physical layer such as the standards IEEE 802.3, Carrier Sense Multiple Access (CSMA) and IEEE 802.4, Token Bus. For purposes of the present invention, the multidirectional repeater is independent of the type of protocol used, but the same protocol and data rate must be used across all of the signal transmission media connected to the multidirectional repeater, including the different physical layers. However, the modulation format and baud (symbol rate) used may be different for each interface.

Each of the physical layer interfaces 21, 22, 23 includes a receive terminal (RX) for providing data transmission of signals received from the signal transmission media to the local bus, a transmit terminal (TX) for transmitting signals received from the local bus to the signal transmission media, and a transmit enable terminal (TXEN) which enables and disables the transmit terminal in response to signals provided by a local bus controller 30 of the Multidirectional Repeater 10, as will be described in greater detail herein after.

The local bus controller 30 controls access to the local bus 12 and also controls the transmitters of the physical layer interfaces 21, 22, 23 for controlling the transmission of data from the local bus to the signal transmission media. Additionally, the multidirectional repeater includes a plurality of local bus buffers (LBB) 35 associated with each of the physical layer interfaces 21,22,23 and with the local processor 14. The local bus buffers 35 act as switches between the receive terminals of the physical layer interfaces 21, 22, 23 and the local bus 12. As described in greater detail herein after, the local bus buffers 35 are responsive to signals provided by the local bus controller 30 for providing a signal path between the physical layer interface receive terminals and the local bus.

The local bus controller 30 detects logic transitions on the input lines 33 to the local bus buffers 35 for determining which local bus buffers to enable and which physical layer interface transmitters to enable. As used herein, the term "logic transition" is intended to refer to the presence or absence of data, a change in a data or logic state, the presence or absence of a carrier, a change in a carrier frequency, or any other suitable indication that data is present on the signal transmission media of a physical layer, which data may be repeated onto other physical layers. The inputs to the local bus buffers 35 are provided from the receive terminals of the physical layer interfaces 21,22,23. A logic transition at the input of a local bus buffer indicates that data is present at the receive terminal of the corresponding physical layer interface. A termination of logic transitions indicates that the data packet is complete.

In order for the local bus controller 30 to function properly, the physical layer interfaces 21,22,23 must prevent their receive terminal outputs to the local bus buffers from toggling when there is no data on the physical layer interface. If the input to the local bus buffer transitions when there is no data on the physical layer interface, the controller will interpret the transition as a data packet and enable the appropriate buffers and transmitters. Therefore, the protocol used for a network using the multidirectional repeater of the present invention must provide a data line code that assures a logic transition when data is being transmitted and no logic transitions when data is not being transmitted. Such a protocol prevents the local bus controller 12 from establishing a communications path when there is no data to be repeated.

Assuming that the multidirectional repeater is one of several nodes on each physical layer bus, e.g., signal transmission media 17, 18, 19, it is important that each physical layer interface 21, 22, 23 have the ability to disable the transmit terminal using the transmit enable terminal such that the local bus controller 30 can turn off the transmitter. With several nodes communicating on the same bus, only the node actually sending data can have its transmitter enabled.

The local bus controller requires a finite amount of time to detect the presence of data on one of the physical layer interfaces and enable the appropriate local bus buffers 35 and physical layer interface transmit terminals. Therefore, the logic transitions are provided with a preamble of data bits to allow time for the local bus controller to react to the incoming data before the information carrying data can be repeated onto the other physical layer interfaces and the local processor. Without the preamble, some of the information carrying data could be lost prior to being repeated.

Figure 2:
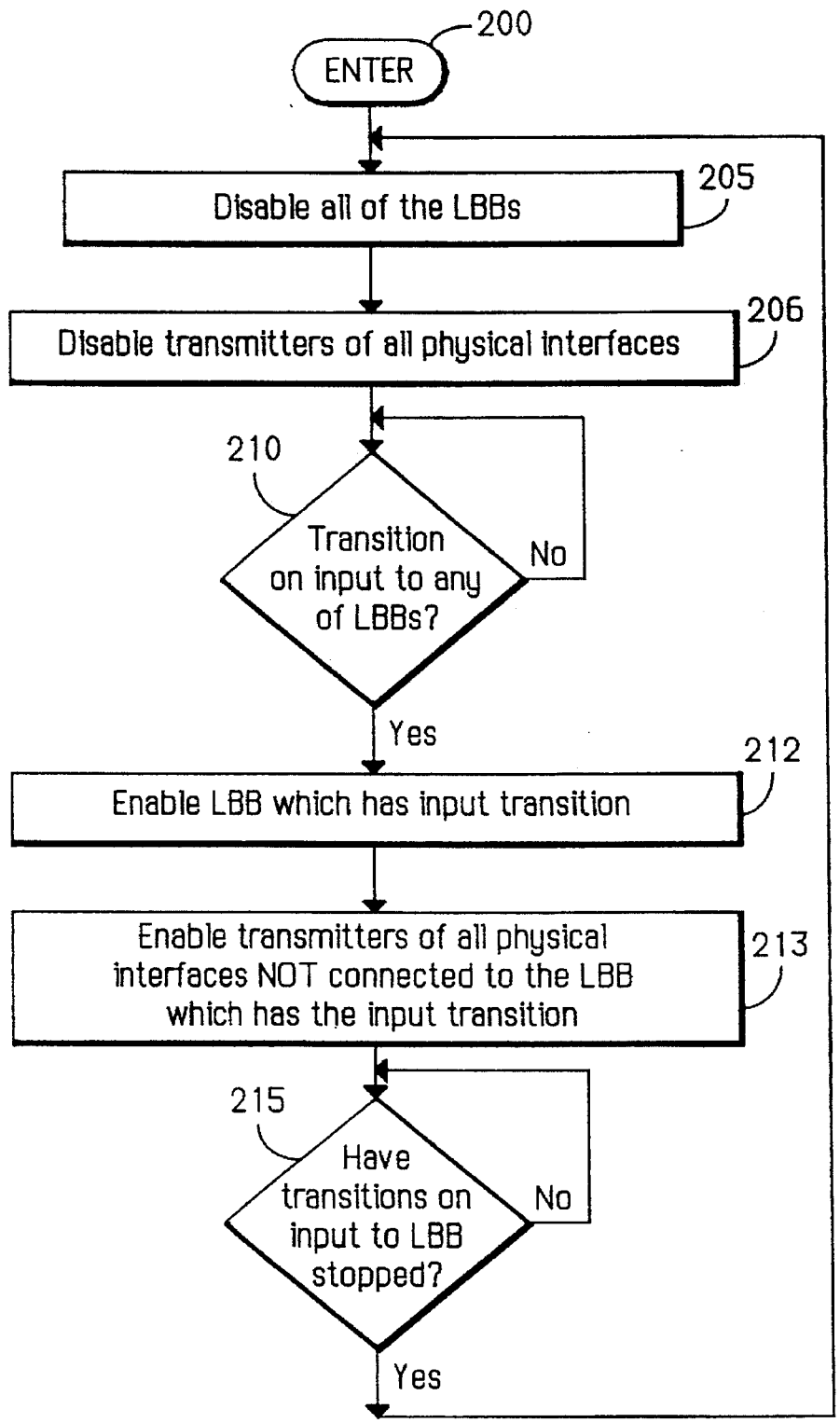
FIG. 2 is a simplified logic flow diagram of a routine utilized by a local bus controller of the multidirectional repeater of FIG. 1.

FIG. 2 is an example of a subroutine which may be implemented by the local bus controller 30 for providing the multidirectional repeater function of the present invention. Referring to FIG. 2, the subroutine is entered in a step 200, and thereafter the repeater is reset in steps 205 and 206. In step 205, all of the local bus buffers are disabled, and in step 206, all of the physical layer interface transmitters are disabled. Thereafter, a test 210 is performed wherein the subroutine checks if a logic transition has been detected on an input to any of the local bus buffers. If the results of the tests 210 are negative, the test 210 is repeated. Once a logic transition is detected on one of the inputs to a local bus buffer, the results of the tests 210 will be positive, and steps 212 and 213 are performed wherein the local bus buffer which had the input logic transition is enabled, and the transmitters for all of the physical layer interfaces not connected to the local bus buffer which had the input logic transition are enabled. Therefore, data being provided from the signal transmission media connected to the enabled local bus buffer may be repeated to the other physical layer interfaces and the local processor. Next, a test 215 is performed wherein the subroutine checks if the logic transitions on the input to the enabled local bus buffer have stopped. If the results of test 215 are negative, the test 215 is repeated. Once the transmission of the data from the signal transmission media is completed, the results of the test 215 will be positive, and the subroutine returns to the steps and tests 205 through 210 wherein the repeater is reset, and it again begins checking for logic transitions on the input to any of the local bus buffers.

The operation of the invention is best understood by example. Referring to FIGS. 1 and 2, if the local bus controller 30 detects a logic transition at the receive terminal output of the twisted pair physical layer interface 23, the local bus buffer connected to the twisted pair physical layer interface is enabled. The coaxial and power line physical layer interface transmit terminals are also enabled. In this way, data received on the twisted pair physical interface 23 is transmitted to the local bus and out onto the coaxial and power line via their respective physical layer interfaces 21, 22. The local processor 14 also receives the data from the twisted pair interface 23 via the local bus 12. When the originating node on the twisted pair stops sending data, the local bus controller 30 detects no more logic transitions and disables the twisted pair interface local bus buffer and the coaxial and power line physical layer interface transmitters.

The above example does not consider the case where logic transitions are detected on more than one of the physical layer interfaces. One method to handle such a situation where there are multiple logic transitions is a first come first serve algorithm used to resolve multiple logic transitions. Using such a first come first serve algorithm, the first logic transition detected would be used to follow the flow of the subroutine of FIG. 2. All subsequent logic transitions on other physical layer interfaces which are detected while the first logic transition is being provided to the local bus are ignored as long as logic transitions continue to be detected at the originating physical layer interface.

With the first come first serve algorithm, the various physical layer interfaces may be provided with a priority scheme such that where multiple logic transitions are simultaneously detected, the logic transition corresponding to the highest priority physical layer interface is used to follow the flow of the subroutine in FIG. 2. With the first come first serve algorithm, the physical layer interface may be very simplistic. In this case, the physical layer interface receive terminal does not have to be disabled when the transmitter is enabled since the local bus buffer prevents the logic transitions from affecting the data on the local bus.

A second, alternative implementation which could be used to resolve multiple logic transitions is to disable the physical layer interface receive terminal whenever the transmitter is enabled. In this way, the local bus controller would not have to resolve conflicts between logic transitions on multiple physical layer interfaces, because when one of the interfaces is transmitting, the receive terminals on the other physical layer interfaces are disabled. Again, if logic transitions are simultaneously detected, a priority or ranking may be used to resolve the conflict.

Although the present invention was described and illustrated with three physical layer interfaces, there are no theoretical limitations to the number of interfaces that could be connected to a multidirectional repeater. The practical limitations would be board space, cost, and power consumption. Additionally, although the local bus controller 30 is described as detecting logic transitions on the input lines 33 to the local bus buffers 35 for determining which local bus buffers 35 to enable, the invention would work equally as well if the local bus controller directly monitored the various signal transmission media 17, 18, 19 to determine if logic transitions are present. In this case, a signal line directly from the signal transmission media 17, 18, 19 would be provided to the local bus controller 30, rather than providing a connection between the local bus buffer input lines 33 and the local bus controller. Alternatively, it is anticipated that a combination of directly monitoring the signal transmission media 17, 18, 19 for some of the physical layers and monitoring the local bus buffer input lines 33 for the other physical layers could be used in accordance with the present invention.

The example of the present invention shows three physically different signal transmission media connected to the multidirectional repeater; however, the multidirectional repeater of the present invention may also be used with multiple signal transmission media of the same type which are electrically isolated from one another. Additionally, although the present invention shows coaxial cable, power line and twisted pair as examples of physically different signal transmission media, any other signal transmission media may be encompassed by the present invention, such as fiber optic cable.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

What is claimed is:

1. A multidirectional repeater for signal transmission between a plurality of signal transmission media which are the same or physically different from one another, said plurality of signal transmission media being electrically isolated from one another, a common protocol and data rate being used across said plurality of signal transmission media, the multidirectional repeater comprising:

a signal transmission bus;

a plurality of switching means, each one of said plurality of switching means being connected between a corresponding one of said plurality of signal transmission media and said signal transmission bus;

control means responsive to data signals being present on one of said plurality of signal transmission media for providing a receive enable signal to a corresponding one of said plurality of switching means, said control means being response to the absence of said data signals on said one of said plurality of signal transmission means for removing said receive enable signal;

wherein said corresponding one of said plurality of switching means is responsive to said receive enable signal for providing a signal path for transmission of said data signals between said corresponding one of said plurality of signal transmission media and said signal transmission bus, and wherein said corresponding one of said plurality of switching means is responsive to said receive enable signal not being provided by said control means for preventing transmission of said data signals between said corresponding one of said plurality of signal transmission media and said signal transmission bus; and a plurality of interface means each having a receive terminal, a transmit terminal and a transmit enable terminal, each interface means being connected between a respective one of said plurality of switching means and a respective one of said plurality of signal transmission media via said receive terminal, each interface means being connected between said signal transmission bus and said respective one of said plurality of signal transmission media via said transmit terminal, and each transmit enable terminal being connected to said control means, said receive terminal providing said data signals from said respective one of said plurality of signal transmission media to said signal transmission bus via said respective one of said plurality of switching means, said transmit terminal transmitting said data signals from said signal transmission bus to said respective one of said plurality of signal transmission media when said transmit terminal is enabled, and said transmit enable terminal being responsive to a transmit enable signal provided by said control means for enabling said transmit terminal.

2. A multidirectional repeater according to claim 1 wherein said transmit enable terminal is further responsive to said transmit enable signal for disabling said receive terminal.

3. A multidirectional repeater according to claim 2 wherein all of said plurality of signal transmission media have an assigned priority and are prioritized with respect to one another and wherein said control means is responsive to said data signals being simultaneously present on more than one of said plurality of signal transmission media for automatically repeating a highest priority one of said data signals present on a respective highest priority one of said plurality of signal transmission media having a respective assigned priority higher than said assigned priority corresponding to one or more other of said more than one of said plurality of signal transmission media.

4. A multidirectional repeater according to claim 1 wherein said control means is further responsive to said data signals being present on said respective one of said plurality of signal transmission media for providing said receive enable signal to said respective one of said plurality of switching means and for providing one or more transmit enable signals, each one of said transmit enable signals being provided to said transmit enable terminal of each one of said plurality of interface means corresponding to said one or more other of said plurality of signal transmission media.

5. A multidirectional repeater according to claim 4 wherein said control means is responsive to said data signals not being present on said respective one of said plurality of signal transmission media for removing said receive enable signal and said transmit enable signals.

6. A multidirectional repeater according to claim 4 wherein each one of said data signals comprises a preamble portion and an information portion, said control means being responsive to a respective preamble portion of a respective one of said data signals present on said respective one of said plurality of signal transmission media for providing said receive enable signal and said transmit enable signals respectively to said respective one of said plurality of switching means and said transmit enable terminal of each one of said plurality of interface means corresponding to said one or more other of said plurality of signal transmission media, wherein in response to said receive enable signal and said transmit enable signals said signal path is provided for a respective information portion corresponding to said respective preamble portion from said respective one of said plurality of signal transmission media to said one or more other of said plurality of signal transmission media via said respective one of said plurality of switching means, said signal transmission bus and said transmit terminal of each interface means corresponding to said one or more other of said plurality of signal transmission media.

7. A multidirectional repeater according to claim 6 wherein said control means is responsive to said respective information portion no longer being present on said respective one of said plurality of signal transmission media for removing said receive enable signal and said transmit enable signals.

8. A multidirectional repeater according to claim 1 further comprising a local processor connected to said signal transmission bus.

9. A multidirectional repeater according to claim 1 wherein said control means is responsive to said data signals being present on more than one of said plurality of signal transmission media for automatically repeating an earliest one of said data signals which was present earliest in time on a corresponding one of said more than one of said plurality of signal transmission media.

10. A multidirectional repeater according to claim 1 wherein all of said plurality of signal transmission media have an assigned priority and are prioritized with respect to one another and wherein said control means is responsive to said data signals being simultaneously present on more than one of said plurality of signal transmission media for automatically repeating a highest priority one of said data signals present on a respective highest priority one of said plurality of signal transmission media having a respective assigned priority higher than said assigned priority corresponding to one or more other of said more than one of said plurality of signal transmission media.

11. A multidirectional repeater according to claim 1 wherein each one of said data signals is one or more logic transitions, and wherein said control means is responsive to said one or more logic transitions being present on said one of said plurality of signal transmission media for automatically repeating said one or more logic transitions to said one or more other of said plurality of signal transmission media, and wherein said control means is responsive to said one or more logic transitions not being present on said one of said plurality of signal transmission media for terminating repeating.

12. A multidirectional repeater according to claim 7 further comprising a local processor connected to said signal transmission bus.

13. A multidirectional repeater according to claim 12 wherein said control means is responsive to said data signals being present on more than one of said plurality of signal transmission media for automatically repeating an earliest one of said data signals which was present earliest in time on a corresponding one of said more than one of said plurality of signal transmission media.

14. A multidirectional repeater according to claim 13 wherein all of said plurality of signal transmission media have an assigned priority and are prioritized with respect to one another and wherein said control means is responsive to said data signals being simultaneously present on more than one of said plurality of signal transmission media for automatically repeating a highest priority one of said data signals present on a respective highest priority one of said plurality of signal transmission media having a respective assigned priority higher than said assigned priority corresponding to one or more other of said more than one of said plurality of signal transmission media.

15. A multidirectional repeater according to claim 7 wherein each one of said data signals is one or more logic transitions.

16. A multidirectional repeater according to claim 12 wherein said transmit enable terminal is further responsive to said transmit enable signal for disabling said receive terminal.

17. A multidirectional repeater according to claim 16 wherein all of said plurality of signal transmission media have an assigned priority and are prioritized with respect to one another and wherein said control means is responsive to said data signals being simultaneously present on more than one of said plurality of signal transmission media for automatically repeating a highest priority one of said data signals present on a respective highest priority one of said plurality of signal transmission media having a respective assigned priority higher than said assigned priority corresponding to one or more other of said more than one of said plurality of signal transmission media.

* * * * *